G. W. BOWERS.
TOBACCO PIPE STEM.
APPLICATION FILED FEB. 15, 1908.
916,097.
Patented Mar. 23, 1909.
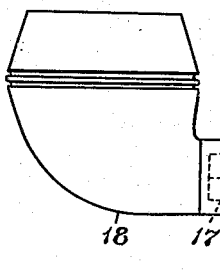
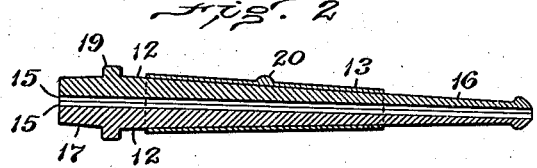
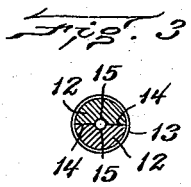
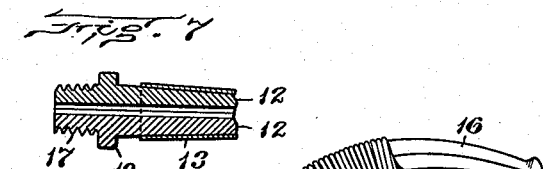
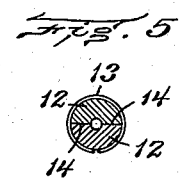
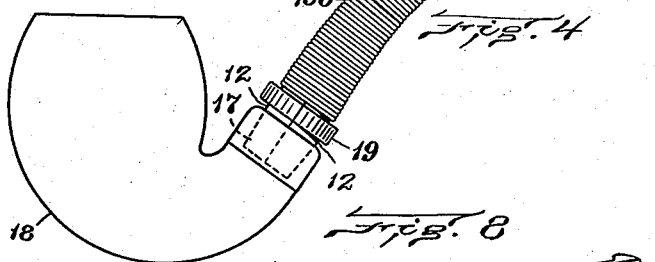
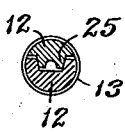
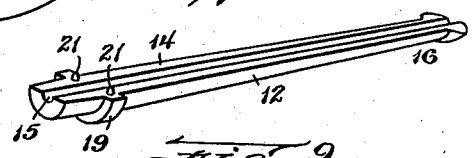
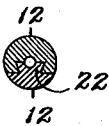
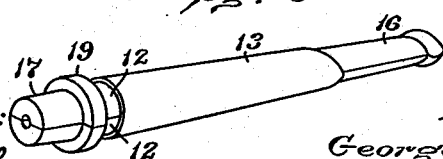
Witnesses:
Walter P. Abell
F. R. Roulstone.
Inventor
George W. Bowers
by Wright Brown Quinby May
Attorneys

UNITED STATES PATENT OFFICE.

GEORGE W. BOWERS, OF SOMERVILLE, MASSACHUSETTS.

TOBACCO-PIPE STEM.

No. 916,097. Specification of Letters Patent. Patented March 23, 1909.

Application filed February 15, 1908. Serial No. 416,030.

*To all whom it may concern:*

Be it known that I, GEORGE W. BOWERS, of Somerville, in the county of Middlesex and State of Massachusetts, have invented certain new and useful Improvements in Tobacco-Pipe Stems, of which the following is a specification.

This invention relates to a tobacco pipe stem, the body of which is composed of longitudinal sections, which are separable from each other, and from the pipe bowl, in order that the smoke duct which is formed between said sections, may be readily exposed for cleansing purposes.

The invention has for its object to provide a stem of this character of simple and durable construction, and adapted to have its parts conveniently and quickly separated and assembled, and adapted, when in condition for use, to be readily applied to and removed from the pipe bowl, the number of parts of the stem being reduced to the minimum.

The invention consists in the improvements which I will now proceed to describe and claim.

Of the accompanying drawings, forming a part of this specification,—Figure 1 represents a side elevation of a pipe having a stem embodying my invention. Fig. 2 represents a longitudinal section of the stem. Fig. 3 represents a transverse section on line 3—3 of Fig. 2. Fig. 4 represents a side view of a modified form of stem embodying my invention. Fig. 5 represents a view similar to Fig. 3, showing a split sleeve. Fig. 6 represents a view similar to Fig. 3, showing a modification in the form of the meeting faces of the stem sections. Fig. 7 represents a sectional view of a portion of the stem, showing a screw thread on the end or shank which engages the bowl. Fig. 8 represents a perspective view of one of the stem sections. Fig. 9 represents a perspective view of the complete stem shown in Figs. 1 and 2. Fig. 10 represents a modification hereinafter referred to.

The same numerals of reference indicate the same parts in all the figures.

In carrying out my invention, I construct a pipe stem of the following general parts; viz., a plurality of separable sections 12 12, forming the body of the stem, and a single elongated sleeve or binder 13 adapted to embrace said sections and hold them properly and closely related to each other with uniformity throughout practically the entire length of the stem. One end which is not inclosed by the binder is held by the bowl of the pipe, and the other end by the mouth of the user. The number of sections is preferably two, but three or more sections may be employed.

The sections 12 may be made of hard rubber, hard wood or any other suitable material, and they are of such form that when assembled, they constitute a stem or stem body having a tapering external surface occupying the greater portion of the length of the stem. The inner side of each section 12, shown in Figs. 1, 2, 3, 4, 8 and 9, is flat, and one or both of said flat sides is provided with a longitudinal groove 15 extending from end to end of the stem, and forming a smoke duct, the flat surfaces of the sections constituting opposed reciprocal bearing faces 14 which are in close contact with each other to form smoke-tight joints.

The sleeve 13 is internally tapered to fit the external taper of the stem, so that the sleeve when forced endwise on to the stem from the smaller toward the larger end, will clamp the sections of the stem closely together, and cause the bearing faces 14 to form tight joints. The sleeve 13 is shorter than the stem body, and is so proportioned that when in its clamping position thereon, the opposite end portions of the sectional stem body will be exposed and project from opposite ends of the sleeve. The sections 12 of the stem body are externally fashioned, so that one of the projecting end portions forms a sectional mouth piece 16, while the other end portion forms a sectional shank 17 adapted to be inserted in a socket in a pipe bowl 18, and held in said socket by friction or otherwise, as by a screw thread connection. (See Fig. 7). The exposed end portion of the stem body which has the shank 17, is preferably provided also with a sectional grip portion 19, here shown as a flange or enlargement having a milled or roughened periphery adapted to be conveniently grasped between a thumb and finger during the operation of turning the stem to insert it in and remove it from the pipe bowl socket. The said grip portion 19 enables the stem to be inserted or removed without disarranging the relative positions of the three members comprising said stem. The sleeve 13 is shown in Figs. 1 and 2 as provided with a boss or projection 20, which enables pressure to be conveniently applied to the sleeve for the purpose of pressing it to and from its confining position.

When the pipe stem is straight, the sleeve 13 is preferably constructed of sheet metal, either in the form of a seamless tube (Fig. 3), or of a split tube (Fig. 5) having sufficient resilience to cause its contraction upon the stem sections.

In Fig. 4 I have shown in the stem sections 12 of curved form, the confining sleeve, here indicated by the numeral 130, being a helical wire coil adapted to fit the curvature and taper of the stem body, and confine the bearing faces of the sections 12 closely against each other.

It will be seen that the sectional stem composed of the parts or pieces specified, is adapted to be quickly and conveniently removed from a pipe, and its parts separated to permit the cleansing of the walls of the smoke duct, and is readily assembled and re-applied to the pipe. The employment of a single elongated confining sleeve or member to hold the longitudinal sections of the stem operatively related to each other, is an important part of my invention, said confining member being shorter than the stem sections, so that it enables the end portions of said sections to be utilized for the mouth piece and the bowl-engaging shank, as described, without the employment of additional pieces to provide these portions. At the same time the connecting or clamping member is so elongated that it has an extended bearing on the external surfaces of the sections, and prevents any liability of the separation of the reciprocal bearing faces 14 at any part of the stem. When the confining member is made in the form of a sheet metal tube, it covers the joint formed by the bearing faces of the stem along the greater portion of the length of the stem, thus reducing the possibility of leakage between the sections to the minimum.

One of the sections 12 may have an offset rib 25 with tapered sides, and the other section, a groove with tapered sides fitting the sides of the rib, the said tapered sides being firmly pressed together to reduce the possibility of leakage at the joint. One of the sections 12 may have dowel pins 21 (Fig. 8) adapted to enter holes in the other section to secure proper registration, In Fig. 10 I show the sections united by a dovetail rib 22 on one section, and a dovetail groove in the other section, said rib and groove being a substitute for the sleeve 13, which in this case is omitted.

I claim:

1. A three-piece pipe stem composed of two stem sections including a shank portion to enter the bowl of a pipe and a mouth piece, and a single elongated sleeve which embraces the stem sections between their ends, said sleeve inclosing practically the entire length of the stem sections excepting the shank portion and the mouth piece end, whereby the sleeve and the pipe bowl conjointly hold all parts of the meeting faces of the sections, including those of the mouth-piece end, in close contact with each other.

2. A three-piece pipe stem composed of two stem sections including a shank portion to enter the bowl of a pipe and a mouth piece, and a single elongated sleeve which embraces the stem sections between their ends, said sleeve inclosing practically the entire length of the stem sections excepting the mouth piece end, the said stem sections being formed with flanges near the shank portion which enters the bowl, said flanges forming an annular grip portion.

In testimony whereof I have affixed my signature, in presence of two witnesses.

GEORGE W. BOWERS.

Witnesses:
C. F. BROWN,
P. W. PEZZETTI.